US011529780B2

(12) United States Patent
Katano

(10) Patent No.: US 11,529,780 B2
(45) Date of Patent: Dec. 20, 2022

(54) MANUFACTURING METHOD FOR HIGH-PRESSURE TANK

(71) Applicant: TOYOTA JIDOSHA KABUSHIKI KAISHA, Toyota (JP)

(72) Inventor: Koji Katano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 17/087,967

(22) Filed: Nov. 3, 2020

(65) Prior Publication Data

US 2021/0221081 A1 Jul. 22, 2021

(30) Foreign Application Priority Data

Jan. 20, 2020 (JP) .............................. JP2020-006719

(51) Int. Cl.
*B29D 22/00* (2006.01)
*F17C 1/16* (2006.01)

(52) U.S. Cl.
CPC ............. *B29D 22/003* (2013.01); *F17C 1/16* (2013.01); *F17C 2201/0109* (2013.01); *F17C 2203/0604* (2013.01); *F17C 2203/0621* (2013.01); *F17C 2203/0658* (2013.01); *F17C 2209/2145* (2013.01); *F17C 2209/2154* (2013.01); *F17C 2209/232* (2013.01)

(58) Field of Classification Search
CPC ........ F17C 2209/232; F17C 2209/2154; F17C 2209/2145; F17C 2203/0658; F17C 2203/0621; F17C 2203/0604; F17C 2201/0109; F17C 1/16; B29D 22/003
See application file for complete search history.

(56) References Cited

U.S. PATENT DOCUMENTS

| | | | |
|---|---|---|---|
| 11,402,065 B2* | 8/2022 | Sonnen | B29C 53/602 |
| 2004/0026431 A1* | 2/2004 | Jones | F17C 1/06 |
| | | | 220/588 |
| 2018/0045371 A1 | 2/2018 | Lee | |

FOREIGN PATENT DOCUMENTS

JP 2018025287 A 2/2018

* cited by examiner

*Primary Examiner* — Vishal I Patel
(74) *Attorney, Agent, or Firm* — Hunton Andrews Kurth LLP

(57) ABSTRACT

A manufacturing method for a high-pressure tank includes joining a cylindrical member and dome members to each other so that a first reinforcing layer and a second reinforcing layer to which a cap is attached are formed, and after a resin material is poured inside the first reinforcing layer, rotating the first reinforcing layer so that the resin material covers an inner surface of the first reinforcing layer, and solidifying the resin material so that the liner is formed. The cap is attached to the first reinforcing layer so that a recessed portion in which the resin material is collected is formed between the cap and the first reinforcing layer. After the first reinforcing layer is rotated, the resin material is solidified in a state where the cap side is positioned on a lower side.

1 Claim, 6 Drawing Sheets

MANUFACTURING METHOD FOR HIGH-PRESSURE TANK

CROSS-REFERENCE TO RELATED APPLICATION

This application claims priority to Japanese Patent Application No. 2020-006719 filed on Jan. 20, 2020, incorporated herein by reference in its entirety.

BACKGROUND

1. Technical Field

The disclosure relates to a manufacturing method for a high-pressure tank.

2. Description of Related Art

As a high-pressure tank such as a hydrogen tank mounted on a fuel-cell vehicle or a hydrogen vehicle, there is known a tank that includes an almost cylindrical liner, a reinforcing layer that covers an outer surface of the liner and is made from a fiber reinforced resin material, and a cap that communicates with an inside of the liner and is made from a metal material. There is a problem with the high-pressure tank configured as above, when an expansion test with use of water pressure is conducted, or when the tank is used from a fully-filled state until an empty state, that tension is generated in an interface between the reinforcing layer and the cap due to a difference between elongation of the fiber reinforcing resin material and elongation of the metal material, thereby affecting the liner.

In order to resolve this problem, as described in Japanese Unexamined Patent Application Publication No. 2018-025287 (JP 2018-025287 A), a method is proposed in which a thickness of a portion of a liner adjacent to a cap is increased so that an influence on the liner caused by a difference in elongation between materials of a reinforcing layer and the cap is reduced.

SUMMARY

Recently, in order to achieve a reduction in weight of a liner, a manufacturing method has been considered in which a reinforcing layer is formed first, and then the liner is formed as a resin material is poured inside the formed reinforcing layer. However, with this manufacturing method, since the liner is formed as a resin material is poured inside the reinforcing layer, it is difficult to increase a thickness of only a specific part of the liner. Therefore, it has been difficult to increase a thickness of only a portion of the liner adjacent to a cap.

The disclosure has been accomplished in order to resolve this technical problem, and an object of the disclosure is to provide a manufacturing method for a high-pressure tank in which a liner is formed as a resin material is poured inside a reinforcing layer, where it is possible to increase a thickness of only a portion of the liner adjacent to a cap.

Provided is a manufacturing method for a high-pressure tank provided with a liner in which gas is stored, a reinforcing layer covering an outer surface of the liner, and a cap that communicates with an inside of the liner. The method includes a first step and a second step. In the first step, two or more split bodies are joined to each other so that the reinforcing layer to which the cap is attached is formed. In the second step, after a resin material is poured inside the reinforcing layer formed in the first step, the reinforcing layer is rotated so that the resin material covers an inner surface of the reinforcing layer, and the resin material is solidified so that the liner is formed. In the first step, the cap is attached to the reinforcing layer so that a depressed portion where the resin material is collected is formed between the cap and the reinforcing layer. In the second step, after the reinforcing layer is rotated so that the resin material covers the inner surface of the reinforcing layer, the resin material is solidified in a state where the cap side is located on a lower side.

With the manufacturing method for the high-pressure tank according to the disclosure, in the first step, the cap is attached to the reinforcing layer so that the depressed portion in which the resin material is collected is formed between the cap and the reinforcing layer. Also, in the second step, after the reinforcing layer is rotated so that the resin material covers the inner surface of the reinforcing layer, the resin material is solidified in the state where the cap side is located on the lower side. Because of this, the resin material is collected in the recessed portion between the cap and the reinforcing layer, and it is thus possible to form a thick portion having a thickness larger than that of the remaining portion of the liner in the depressed portion. As a result, even with the manufacturing method by which the liner is formed as the resin material is poured inside the reinforcing layer, it is possible to increase a thickness of only a portion of the liner adjacent to the cap. Thus, it is possible to reduce an influence on the liner due to a difference in elongation between materials of the reinforcing layer and the cap.

According to the disclosure, even with the manufacturing method in which the liner is formed as the resin material is poured inside the reinforcing layer, it is possible to form the liner so as to increase a thickness of a portion adjacent to the cap.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a manufacturing method for a high-pressure tank is described below with reference to the drawings. Prior to that, a configuration of the high-pressure tank 10 is described based on FIG. 1. In this embodiment, the high-pressure tank 10 is described as an example that is mounted on a fuel-cell vehicle and filled with high-pressure hydrogen gas. However, the high-pressure tank 10 may also be applied for other purposes. Gas that can be filled in the high-pressure tank 10 is not limited to high-pressure hydrogen gas.

Figure 1:
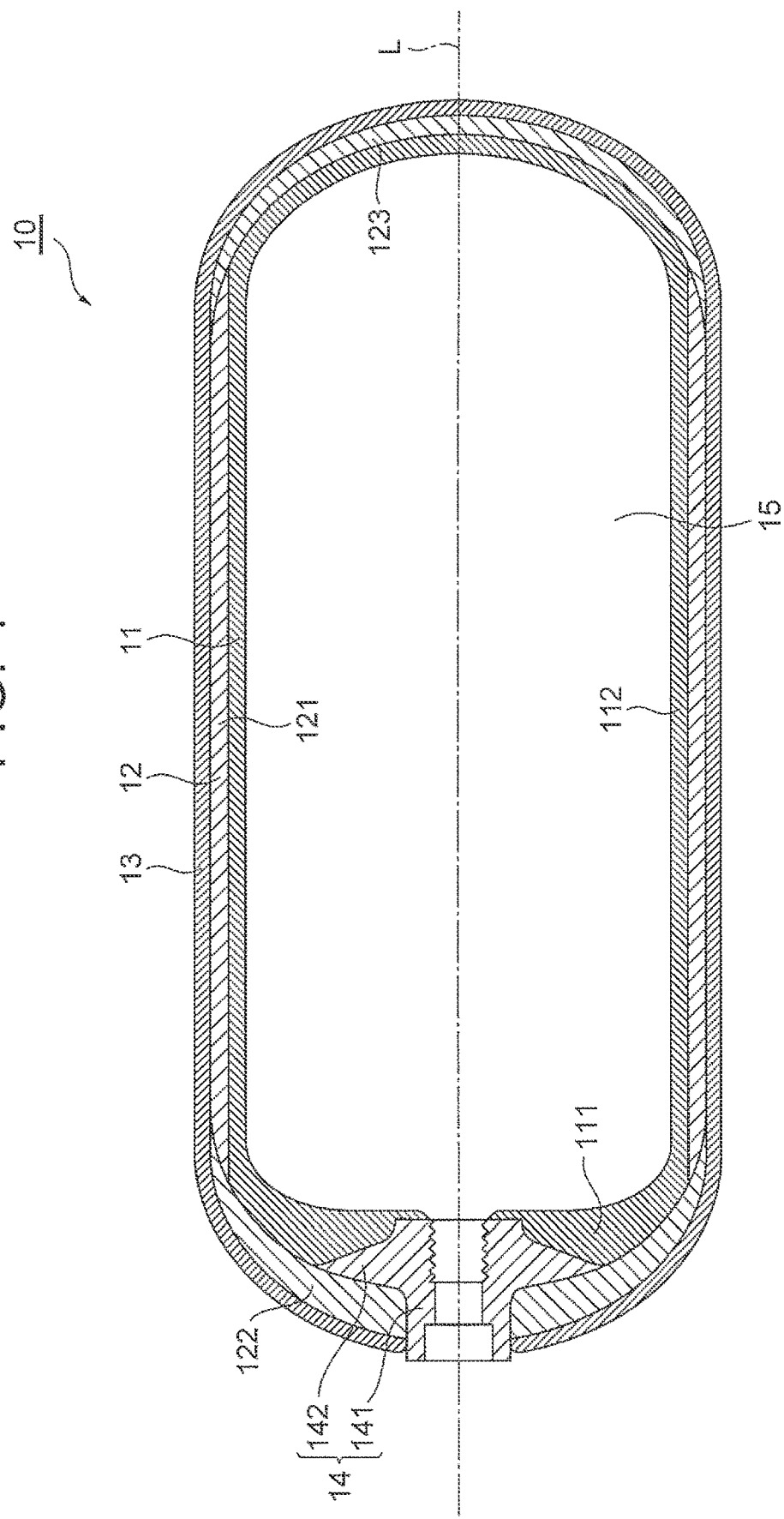
FIG. 1 is a schematic sectional view showing a configuration of a high-pressure tank.

FIG. 1 is a schematic sectional view showing a configuration of the high-pressure tank. The high-pressure tank 10 is an almost cylindrical high-pressure gas storage container having both ends rounded like domes. The high-pressure tank 10 includes a liner 11 having a gas barrier property, a first reinforcing layer 12, and a second reinforcing layer 13. The first reinforcing layer 12 covers an outer surface of the liner 11 and is made from a fiber reinforced resin material. The second reinforcing layer 13 covers an outer surface of the first reinforcing layer 12 and is made from a fiber reinforced resin material. A circular opening 124 (see FIG. 3) is formed in a first end of the high-pressure tank 10 in an axis L direction, and an almost cylindrical cap 14 is attached to the opening 124. Meanwhile, no opening is made in a second end of the high-pressure tank 10 in the axis L direction, and no cap is provided either.

The liner 11 is formed along the inner surface of the first reinforcing layer 12. The liner 11 is a resin member that forms a storage space 15 filled with high-pressure hydrogen gas. It is preferred that the resin that configures the liner 11 is resin that has an excellent performance of holding gas to be filled (hydrogen gas in this case) inside the storage space 15, in other words, an excellent gas barrier property. This kind of resin may be, for example, thermoplastic resin such as polyamide, polyethylene, ethylene-vinyl alcohol copolymer (EVOH), and polyester, or thermosetting resin such as epoxy. As fuel gas, the storage space 15 of the liner 11 may be filled with not only hydrogen gas, but also, for example, various types of compressed gas such as compressed natural gas (CNG), various types of liquefied gas such as liquefied natural gas (LNG) and liquefied petroleum gas (LPG), and other types of gas.

As shown in FIG. 1, the liner 11 includes a thick portion 111 and a thin portion 112. The thick portion 111 is formed in a portion adjacent to the cap 14 and has a relatively large thickness. The thin portion 112 is formed in the remaining portion excluding the portion adjacent to the cap 14 and has a relatively small thickness. Then, in a view form the axis L direction, the thick portion 111 is arranged around the cap 14 so as to surround the cap 14 and holds the cap 14.

The cap 14 is made as a metal material such as stainless steel and aluminum is formed into a given shape. The cap 14 has an almost cylindrical cap body 141, and a flange portion 142 that is fitted between the liner 11 and a dome member 122 (described later) of the first reinforcing layer 12. A valve (not shown) used for filling and discharging hydrogen gas in and from the storage space 15 is attached to the cap 14.

The first reinforcing layer 12 covers the outer surface of the liner 11 and has a function of reinforcing the liner 11 so that mechanical strength such as rigidity and pressure resistance of the high-pressure tank 10 is improved. The first reinforcing layer 12 includes a cylindrical member 121 and two dome members 122, 123 arranged in both end portions of the cylindrical member 121 in an axis direction (in other words, the axis L direction of the high-pressure tank 10). The cylindrical member 121 and the dome members 122, 123 are made into a single body.

The first reinforcing layer 12 is made from resin and fiber (continuous fiber). In the cylindrical member 121, the fiber is formed circumferentially at an angle almost orthogonal to the axis L direction of the cylindrical member 121. In other words, in the cylindrical member 121, the fiber is oriented in a circumferential direction of the cylindrical member 121. Because the fiber is oriented in the circumferential direction in the cylindrical member 121, strength of the first reinforcing layer 12 against hoop stress generated by inner pressure (gas pressure) is ensured because of an adequate amount of the fiber reinforcing resin.

Meanwhile, in the dome members 122, 123, the fiber is not oriented in the circumferential direction of the cylindrical member 121, and the fibers extending in various directions that intersect the circumferential direction are arranged so as to overlap each other. Thus, with the dome members 122, 123, strength of the first reinforcing layer 12 against stress generated by inner pressure (gas pressure) is ensured because of the adequate amount of the fiber reinforcing resin.

In the embodiment, the fiber in the cylindrical member 121 and the fibers in the dome members 122, 123 are not continuous (in other words, they are not linked to each other). This is because, after the cylindrical member 121 and the two dome members 122, 123 are formed separately, the two dome members 122, 123 are joined to both ends of the cylindrical member 121 as described later.

The second reinforcing layer 13 is formed so as to cover the outer surface of the first reinforcing layer 12. The second reinforcing layer 13 covers the cylindrical member 121, and the dome members 122, 123 entirely. The second reinforcing layer 13 is made from resin and fiber (continuous fiber).

Figure 2:
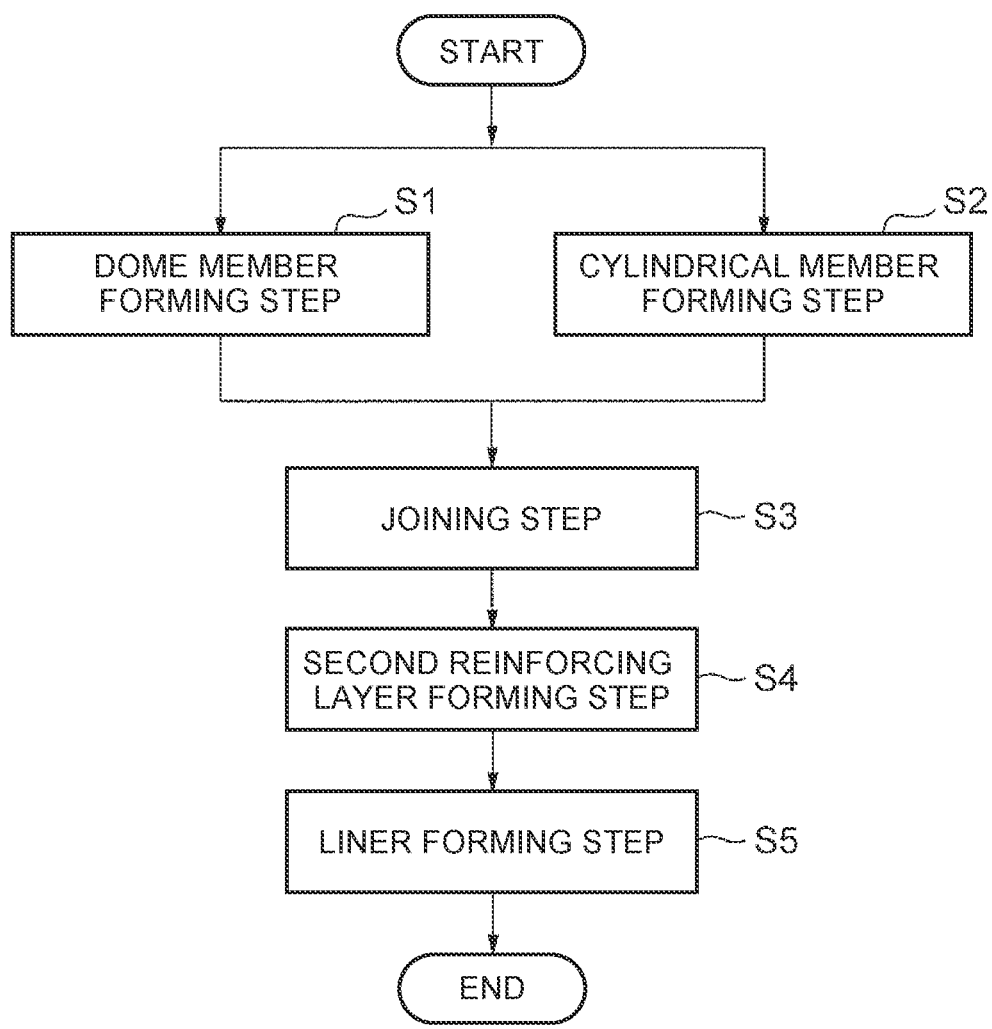
FIG. 2 is a flowchart of a manufacturing method for the high-pressure tank.

Hereinafter, the manufacturing method for the high-pressure tank 10 is described. FIG. 2 is a flowchart of the manufacturing method for the high-pressure tank. The manufacturing method for the high-pressure tank 10 includes a dome member forming step S1, a cylindrical member forming step S2, a joining step S3, a second reinforcing layer forming step S4, and a liner forming step S5. Since the dome member forming step S1 and the cylindrical member forming step S2 are steps independent form each other, these steps may be performed simultaneously, and either one of the steps may be performed prior to the other.

In the dome member forming step S1, a wound body is fabricated as a resin-impregnated fiber bundle is wound around a given mold so as to cover an outer surface of the given mold with use of, for example, a filament winding method (FW method). Then, after the fabricated wound body is solidified, the wound body is split by a cutter or the like so that the two dome members 122, 123 are formed (see FIG. 3). Here, one of the formed dome members 122, 123 (in this embodiment, the dome member 122) has the opening 124. The dome member 122 and the dome member 123 formed as described above correspond to "split bodies" described in the claims.

The resin impregnated in the fiber bundle is not particularly limited. However, thermosetting resin may be used. It is preferred that the thermosetting resin is phenol resin, melamine resin, urea resin, or epoxy resin, and epoxy resin is especially preferred in terms of mechanical strength and so on. Generally, epoxy resin is obtained as prepolymer such as copolymer of bisphenol A and epichlorohydrin, and a curing agent such as polyamine are mixed and thermally cured. Epoxy resin has fluidity in an uncured state, and forms a robust crosslinking structure after being thermally cured. As the resin impregnated in the fiber bundle, thermoplastic resin may also be used. As the thermoplastic resin, polyetheretherketone, polyphenylene sulfide, polyacrytic ester, polyimide, polyamide, or the like may be used.

As fiber that configures the fiber bundle, glass fiber, aramid fiber, boron fiber, carbon fiber, or the like may be used, and it is especially preferred that carbon fiber is used in terms of weight reduction, mechanical strength, and so on.

A method for solidifying the wound body (in other words, solidifying the resin in the fiber bundle) is not particularly limited. However, when the resin in the fiber bundle is the thermosetting resin, the resin may be precured. Conditions for the precuring (temperature and time) are changed depending on a type of the resin in the fiber bundle. However, the conditions are set so that viscosity of the resin in the fiber bundle becomes higher than viscosity when the fiber bundle is wound around the given mold (viscosity before precuring). Here, as the precuring, the fiber bundle is cured until the resin in the fiber bundle loses its fluidity. Meanwhile, when the resin in the fiber bundle is the thermoplastic resin, the resin in the fiber bundle may be solidified as the fiber bundle in which the resin has fluidity is cooled.

As the resin in the fiber bundle is solidified as described above, it is possible to restrain deformation of the fiber bundle when the fiber bundle is cut with a cutter or the like (in other words, at the time of splitting). At the same time, it is possible to restrain deformation of the dome members 122, 123 when they are removed from the given mold.

In the cylindrical member forming step S2 a fiber sheet is stuck on an inner surface of a rotating cylindrical mold with use of, for example, a centrifugal winding (CW) method. Thus, the cylindrical member 121 is formed. The fiber sheet contains at least fiber that is oriented in, for example, the circumferential direction of the cylindrical mold. Thus, it is possible to obtain the cylindrical member 121 in which the fiber is oriented in the circumferential direction. The cylindrical member 121 obtained corresponds to the "split body" described in the claims.

The fiber sheet may be, for example, a so-called unidirection (UD) sheet in which a plurality of fiber bundles arranged in a single direction is braided by a cramping thread, or a fiber sheet in which a plurality of fiber bundles arranged in a single direction is braided with a plurality of fiber bundles intersecting those fiber bundles in, for example, an orthogonal direction. The fiber sheet may be a fiber sheet in which resin is not impregnated in advance, or a fiber sheet in which resin is impregnated in advance.

The resin impregnated in the fiber sheet is not particularly limited. However, for example, thermosetting resin may be used. It is preferred that thermosetting resin such as phenol resin, melamine resin, urea resin, and epoxy resin is used similarly to that for the foregoing fiber bundle, and epoxy resin is especially preferred in terms of mechanical strength and so on.

Fibers that configure the fiber sheet may be, glass fiber, aramid fiber, boron fiber, carbon fiber, and so on similarly to that for the foregoing fiber bundle, and carbon fiber is especially preferred in terms of weight reduction, mechanical strength, and so on.

Figure 3:
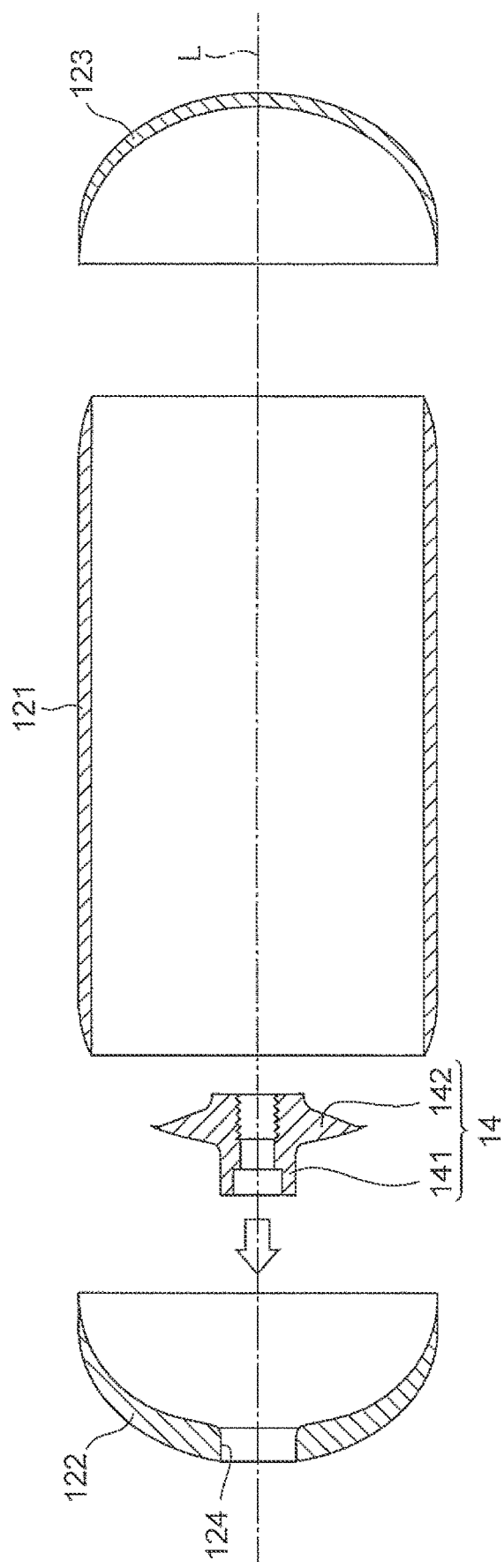
FIG. 3 is a schematic view describing the manufacturing method for the high-pressure tank.

As shown in FIG. 3, the cylindrical member 121 formed on the inner surface of the cylindrical mold is formed so that its thicknesses of the both ends in the axis L direction are reduced gradually. Thus, when the cylindrical member 121 and the two dome members 122, 123 are fitted and joined to each other, it is unlikely that a level difference is formed in joining portions of the cylindrical member 121 and the two dome members 122, 123. Therefore, it is possible to restrain a void from being formed between the first reinforcing layer 12 and the second reinforcing layer 13, the void being caused by the level difference in the joining portions of the cylindrical member 121 and the dome members 122, 123.

When the resin for the cylindrical member 121 is thermosetting resin (in other words, when a fiber sheet impregnated with thermosetting resin is used), it is necessary to solidify the cylindrical member 121 by precuring of the resin. Conditions for the precuring (temperature and time) are changed depending on a type of the resin. However, the conditions are set so that viscosity of the resin becomes higher than viscosity when the fiber sheet is wound around the cylindrical mold. Here, as the precuring, the fiber sheet is cured until the resin in the fiber sheet loses its fluidity.

Figure 4:
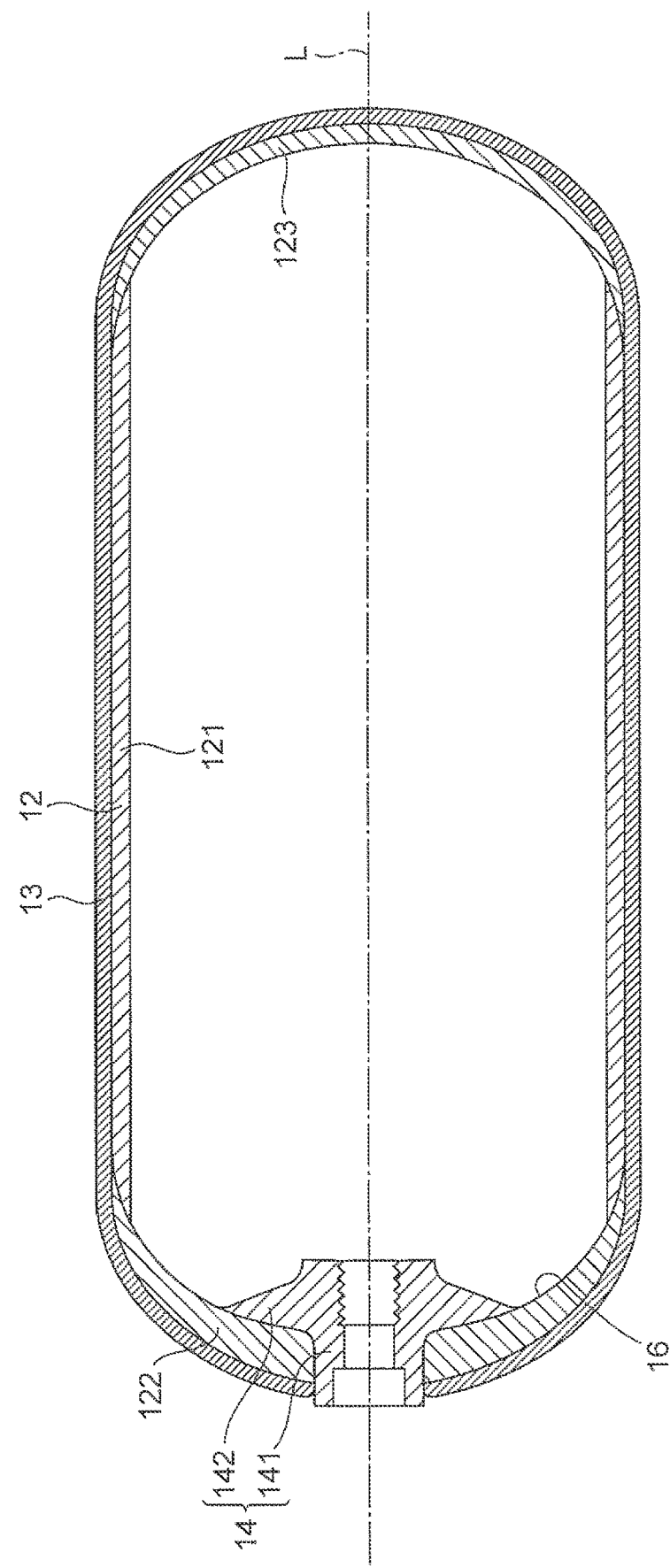
FIG. 4 is a schematic view describing the manufacturing method for the high-pressure tank.

As shown in FIG. 3, in the joining step S3, the first reinforcing layer 12 is formed as both end portions of the cylindrical member 121 and end portions of the two dome members 122, 123 are joined to each other, respectively. Specifically, first of all, the cap 14 is attached to the dome member 122 having the opening 124. At this time, for example, the cap 14 is inserted into the opening 124 from the inner side of the dome member 122 so that a depressed portion 16 (see FIG. 4) is formed between the fitted cap 14 and the dome member 122 (see an arrow in FIG. 3). Then, the cap 14 is further inserted until the flange portion 142 of the cap 14 hits the inner side of the dome member 122.

Next, in a state where the end portions of the dome members 122, 123 are located on the outer side, and the both end portions of the cylindrical member 121 are located on the inner side, these members are fitted and joined to each other. Since the end portions of the cylindrical member 121, the end portion of the dome member 122, and the end portion of the dome member 123 are formed into circumferential shapes, respectively, the end portion of the dome member 122 and the end portion of the dome member 123 come into contact with the entire circumferences of the end portions of the cylindrical member 121, respectively.

At this time, an adhesive or the like may be arranged between the cylindrical member 121 and the dome members 122, 123. This restrains the cylindrical member 121 and the dome members 122, 123 from being separated from each other. Also, since gaps between the cylindrical member 121 and the dome members 122, 123 are filled, the resin material to be formed into the liner 11 is prevented from flowing into the gaps between the cylindrical member 121 and the dome members 122, 123, respectively, in the liner forming step S5.

In the joining step S3, in a state where the end portions of the dome members 122, 123 are located on the inner side, and the both end portions of the cylindrical member 121 are located on the outer side, these members may be fitted and joined to each other.

In the second reinforcing layer forming step S4, for example, the filament winding method in which a fiber bundle impregnated with resin is used to form the second reinforcing layer 13 that is made from a fiber reinforcing resin material (see FIG. 4) so that the second reinforcing layer 13 covers the outer surface of the first reinforcing layer 12, that is outer surfaces of the cylindrical member 121 and the two dome members 122, 123. Here, the second reinforcing layer 13 may also be formed with use of a sheet winding method in which a fiber sheet impregnated with resin is used.

The resin impregnated in the fiber bundle is not particularly limited. However, thermosetting resin may be used. It is preferred that the thermosetting resin is phenol resin, melamine resin, urea resin, or epoxy resin, and epoxy resin is especially preferred in terms of mechanical strength and so on. As fiber that configures the fiber bundle, glass fiber, aramid fiber, boron fiber, carbon fiber, or the like may be used, and it is especially preferred that carbon fiber is used in terms of weight reduction, mechanical strength, and so on.

Next, the first reinforcing layer 12 on which the fiber bundle is wound is conveyed to a curing oven, and is heated at, for example, 160° C. for 10 minutes in the curing oven, and the resin in the fiber bundle is thermally cured. Thus, the second reinforcing layer 13 is formed.

The dome member forming step S1, the cylindrical member forming step S2, the joining step S3, and the second reinforcing layer forming step S4 correspond to a "first step" described in the claims.

In the liner forming step S5, after a resin material M is poured inside the first reinforcing layer 12, the first reinforcing layer 12 and the second reinforcing layer 13 formed in the foregoing steps are rotated so that the poured resin material M covers the inner surface of the first reinforcing layer 12. Then, the resin material M is solidified. Thus, the liner 11 is formed.

Figure 5:
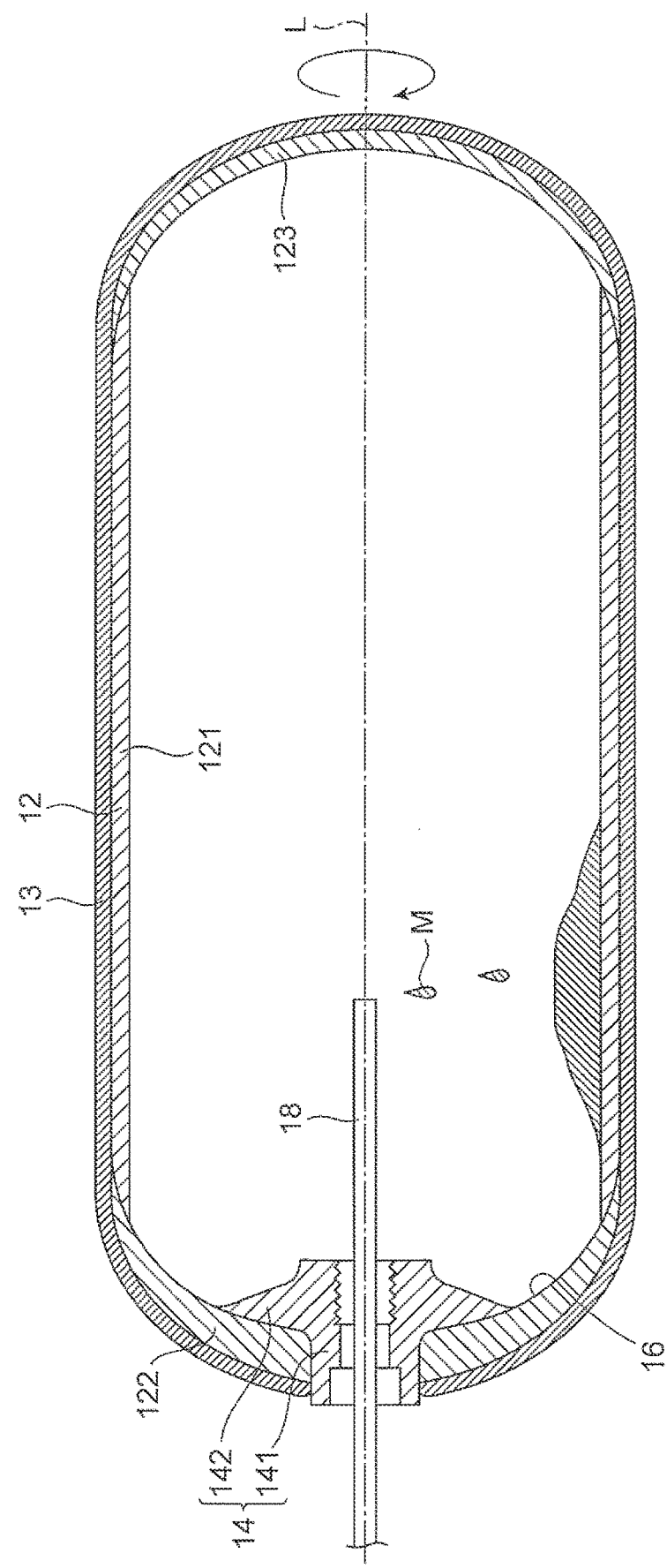
FIG. 5 is a schematic view describing the manufacturing method for the high-pressure tank.

Specifically, as shown in FIG. 5, the first reinforcing layer 12 and the second reinforcing layer 13 to which the cap 14 is attached are arranged horizontally (so that the axis L direction coincides with the horizontal direction), and a nozzle 18 is inserted into the first reinforcing layer 12 through an opening of the cap 14. Next, the fluid resin material M is poured inside the first reinforcing layer 12 through the nozzle 18, and then the nozzle 18 is pulled out from the cap 14. Thereafter, a plug member 17 closes the opening of the cap 14.

As described above, it is preferred that the resin material M is resin having an excellent gas barrier property. This kind of resin may be, for example, thermoplastic resin such as polyamide, polyethylene, ethylene-vinyl alcohol copolymer (EVOH), and polyester, or thermosetting resin such as epoxy. However, polyamide is preferred.

Next, the first reinforcing layer 12 and the second reinforcing layer 13 are rotated so that the resin material M covers the inner surface of the first reinforcing layer 12. Specifically, the inner space of the first reinforcing layer 12 is heated to given temperature or higher as necessary, and, in a state where the resin material M has fluidity with low viscosity (0-0.05 Pa·s), the first reinforcing layer 12 and the second reinforcing layer 13 are, for example, rotated in a circumferential direction around the axis L. Thus, the fluid resin material M first comes into contact with the entire surface of the cylindrical member 121 of the first reinforcing layer 12. Next, as the first reinforcing layer 12 and the second reinforcing layer 13 are rotated in a state where the cap 14 side is located on the upper side, the resin material M comes into contact with the entire surface of the dome member 123 of the first reinforcing layer 12.

Figure 6:
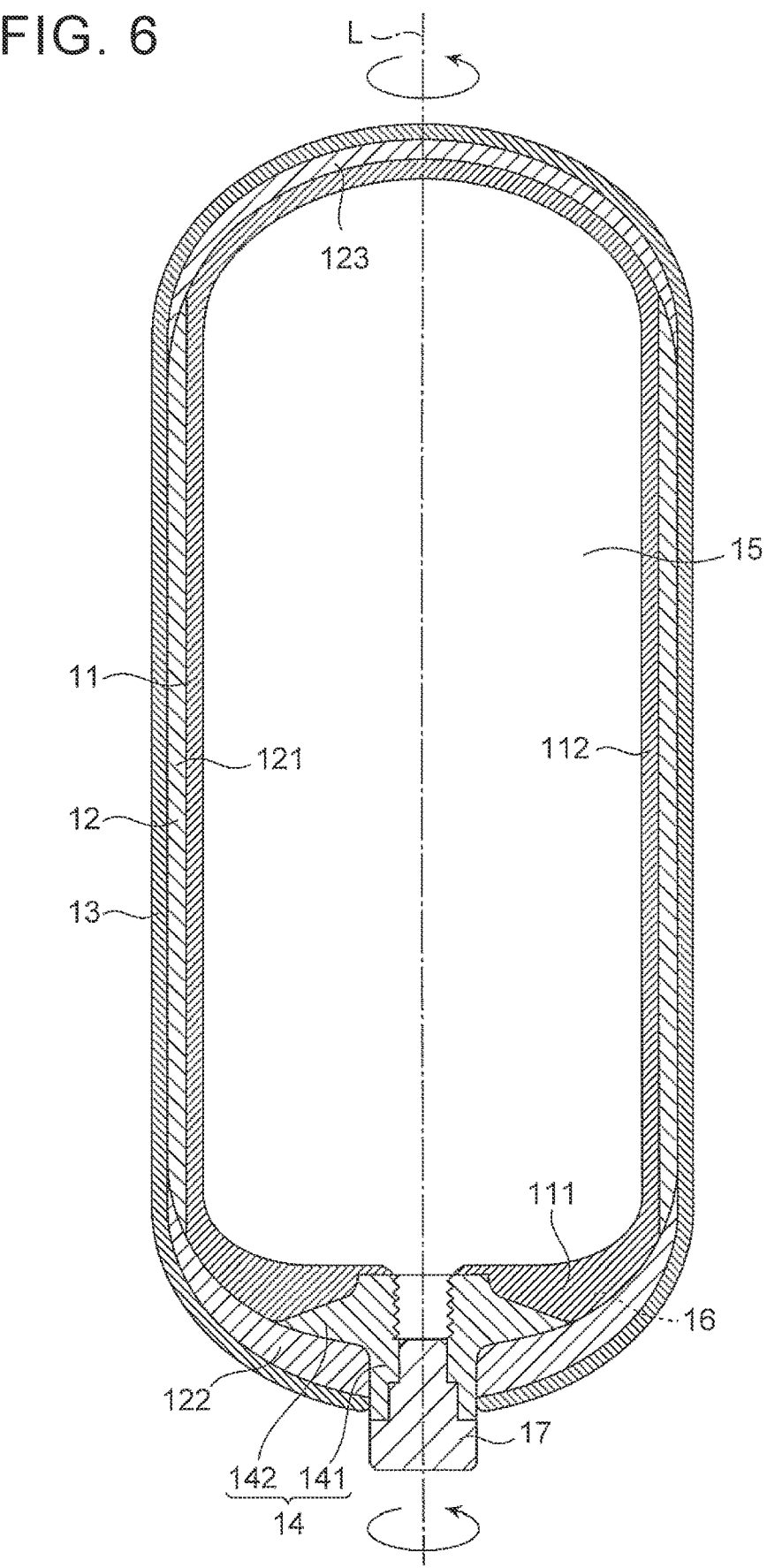
FIG. 6 is a schematic view describing the manufacturing method for the high-pressure tank.

Thereafter, in a state where the cap 14 side is position on the lower side, the first reinforcing layer 12 and the second reinforcing layer 13 are arranged vertically (see FIG. 6). Thus, a part of the resin material M having fluidity is poured into the depressed portion 16, and the resin material M is collected in the depressed portion 16. As a result, the thick portion 111 having a thickness larger than that of the remaining portion of the liner is formed in the depressed portion 16. At this time, the first reinforcing layer 12 and the second reinforcing layer 13 may be rotated around the axis L in the state where the cap 14 side is located on the lower side.

Next, the resin material M is solidified. Here, when the resin material M is thermosetting resin, the resin material M is cured as, for example, the first reinforcing layer 12 is heated, and the liner 11 is thus formed. Meanwhile, when the resin material M is thermoplastic resin, the resin material M is solidified in a state where the resin material M is in contact with and covers the inner surface of the first reinforcing layer 12 as temperature of the first reinforcing layer 12 is decreased, and the liner 11 is thus formed.

The liner forming step S5 corresponds to a "second step" described in the claims.

With the manufacturing method for the high-pressure tank according to the embodiment, the cap 14 is attached to the first reinforcing layer 12 so that the depressed portion 16 where the resin material M is collected is formed between the cap 14 and the first reinforcing layer 12 in the joining step S3. Then, in the liner forming step S5, after the first reinforcing layer 12 is rotated so that the resin material M covers the inner surface of the first reinforcing layer 12, the resin material M is solidified in the state where the cap 14 side is located on the lower side. Because of this, the resin material M is collected in the depressed portion 16 between the cap 14 and the first reinforcing layer 12, and it is thus possible to form the thick portion 111 in the depressed portion 16, the thick portion 111 having the thickness larger than that of the remaining part of the liner 11. As a result, even with the manufacturing method in which the resin material M is poured inside the first reinforcing layer 12 to form the liner 11, only the portion of the liner 11 adjacent to the cap 14 is formed to be thicker, and influence on the liner 11 caused by a difference in the material elongation between the first reinforcing layer 12 and the cap 14 can be reduced.

The embodiment of the disclosure has been described in detail. However, the disclosure is not limited to the foregoing embodiment, and various design changes may be made without departing from the spirit of the disclosure described in the claims.

What is claimed is:

1. A manufacturing method for a high-pressure tank provided with a liner in which gas is stored, a reinforcing layer covering an outer surface of the liner, and a cap that communicates with an inside of the liner, the method comprising:

a first step in which two or more split bodies are joined to each other so that the reinforcing layer to which the cap is attached is formed; and a second step in which, after a resin material is poured inside the reinforcing layer formed in the first step, the reinforcing layer is rotated so that the resin material covers an inner surface of the reinforcing layer, and the resin material is solidified so that the liner is formed, wherein:

in the first step, the cap is attached to the reinforcing layer so that a depressed portion where the resin material is collected is formed between the cap and the reinforcing layer; and in the second step, after the reinforcing layer is rotated so that the resin material covers the inner surface of the reinforcing layer, the resin material is solidified in a state where the cap side is located on a lower side.

* * * * *